(12) United States Patent
Lane et al.

(10) Patent No.: US 9,746,631 B1
(45) Date of Patent: Aug. 29, 2017

(54) OPTICAL PATCH PANEL

(71) Applicant: Amazon Technologies, Inc., Seattle, WA (US)

(72) Inventors: Michael Bruce Lane, Seattle, WA (US); David John O'Meara, Seattle, WA (US); Mark Noel Kelly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/344,418

(22) Filed: Nov. 4, 2016

Related U.S. Application Data

(62) Division of application No. 14/318,030, filed on Jun. 27, 2014, now Pat. No. 9,488,795.

(51) Int. Cl.
*G02B 6/44* (2006.01)
*G02B 6/38* (2006.01)

(52) U.S. Cl.
CPC .......... *G02B 6/4452* (2013.01); *G02B 6/3897* (2013.01); *G02B 6/4446* (2013.01)

(58) Field of Classification Search
CPC .. G02B 6/3897; G02B 6/4439; G02B 6/4446; G02B 6/4452
See application file for complete search history.

(56) References Cited

U.S. PATENT DOCUMENTS

| | | | | |
|---|---|---|---|---|
| 5,530,954 A * | 6/1996 | Larson | ............... | G02B 6/4452 385/135 |
| 7,094,095 B1 * | 8/2006 | Caveney | ............. | G02B 6/3897 385/134 |
| 7,889,962 B2 * | 2/2011 | Nair | ................. | G02B 6/4452 385/134 |
| 8,059,931 B2 * | 11/2011 | Russell | ............... | G02B 6/4452 385/134 |
| 8,152,385 B2 * | 4/2012 | de Jong | ............... | G02B 6/3879 385/53 |
| 8,485,737 B2 * | 7/2013 | Kolesar | ............... | G02B 6/4472 385/24 |
| 9,488,795 B1 * | 11/2016 | Lane | ................... | G02B 6/4452 |
| 2002/0141720 A1 * | 10/2002 | Halgren | ................. | H04Q 1/13 385/134 |
| 2010/0098428 A1 * | 4/2010 | Barnes | ................. | G02B 6/4453 398/140 |
| 2010/0209063 A1 * | 8/2010 | Hoshino | .............. | G02B 6/3897 385/135 |

(Continued)

*Primary Examiner* — Daniel Petkovsek
(74) *Attorney, Agent, or Firm* — Thorpe North & Western, LLP.

(57) ABSTRACT

Optical patch panels are disclosed. In one example, a housing module may include at least one wall arranged to present connectors for mating with optical cables. A plurality of trunk connectors may be arranged in at least one wall of the housing module, each of the trunk connectors being connectable to an optical trunk line entering the housing module. A plurality of duplex fiber connectors may be arranged in at least one wall of the housing module, the duplex fiber connectors being operable to mate with downstream networking equipment, the duplex fiber connectors being arranged in clusters, each cluster presenting a group of four pairs of duplex fiber connectors. The duplex fiber connectors in a cluster may be optically coupled to one of the plurality of trunk lines via the plurality of trunk connectors.

20 Claims, 11 Drawing Sheets

(56) References Cited

U.S. PATENT DOCUMENTS

| | | | | |
|---|---|---|---|---|
| 2013/0051733 A1* | 2/2013 | Gallegos | .............. | G02B 6/3879 |
| | | | | 385/76 |
| 2014/0348467 A1* | 11/2014 | Cote | .................... | G02B 6/3616 |
| | | | | 385/71 |
| 2015/0364876 A1* | 12/2015 | Grandidge | ........... | G02B 6/4452 |
| | | | | 385/135 |

* cited by examiner

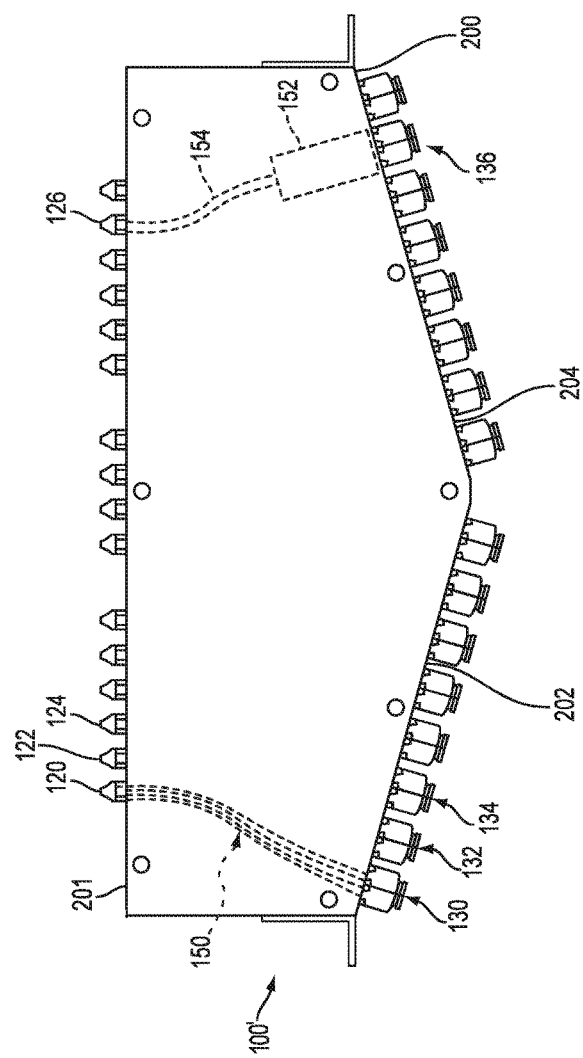

| MTP | LC |
|---|---|
| 12 | AQU 1A |
| 1 | BLU 1B |
| 11 | ORN 2A |
| 2 | ROS 2B |
| 10 | GRN 3A |
| 3 | VIO 3B |
| 9 | BRN 4A |
| 4 | YEL 4B |

| MTP | LC |
|---|---|
| 12 | AQU 1A |
| 1 | BLU 1B |
| 11 | ORN 2A |
| 2 | ROS 2B |
| 10 | GRN 3A |
| 3 | VIO 3B |
| 9 | BRN 4A |
| 4 | YEL 4B |

OPTICAL PATCH PANEL

This application is a Divisional of U.S. patent application Ser. No. 14/318,030, filed on Jun. 27, 2014, issued as U.S. Pat. No. 9,488,795, which is incorporated herein by reference.

BACKGROUND

Optical fibers are widely used in numerous communications systems, as optical fibers provide transmission of data over longer distances and at higher bandwidths than do wire cables. Joining lengths of optical fibers or cables is far more sensitive and complex than joining existing wire. Specialized fiber optic connectors are generally used when interfacing optical fibers or cables with one another or with switches and transceivers.

In one specific application where optical fibers are used to communicate between high speed servers, existing QSFP (Quad (4-channel) Small Form-factor Pluggable) 40 Gbps (or 40G, or 40 Gigabits per second) optical module/transceivers may be broken out into four optics pairs of 10 Gbps each. This optical layout may have an MPO (Multiple Fiber Push-on Pull-off) or MTP (a specific brand name for a connector which interconnects with MPO) connector with twelve optical pins, of which, four pairs (eight pins) are used to provide four channels of 10G.

Typically, breaking out these discreet channels is accomplished by using an MTP/MPO to 4×LC connector optical breakout cable. An LC connector is one form of a duplex fiber connector, and an LC connector is also known as a local connector, a Lucent connector, or a little connector. Other forms of duplex fiber connectors include, without limitation, SC connectors (subscriber connector, or square connector or standard connector), FC connectors (ferrule connector or fiber channel) and the like. Since many client server and switch connections today are 10G, the conversion from 40G to 10G is used to ensure that 10G clients have connectivity. This solution is manageable in small installations where a limited number of breakouts are required, such as TOR (top of rack) applications. However, as one starts adopting networking equipment (switches) that have higher density QSFP ports, e.g. thirty-two ports in one rack unit (an "RU" is about 1.75 inches high×19 inches length), the cable breakout solution may become problematic.

BRIEF DESCRIPTION OF THE DRAWINGS

FIG. 6 is a top view of another rack mount housing in accordance with an example of the present technology.

FIG. 7C is an exemplary diagram showing a layout of connections between the ports of the patch panel of FIGS. 7A and 7B in accordance with an example of the present technology.

FIG. 8C is an exemplary layout diagram showing connections between the ports of the patch panel of FIGS. 8A and 8B in accordance with an example of the present technology.

DETAILED DESCRIPTION

Figure 1:
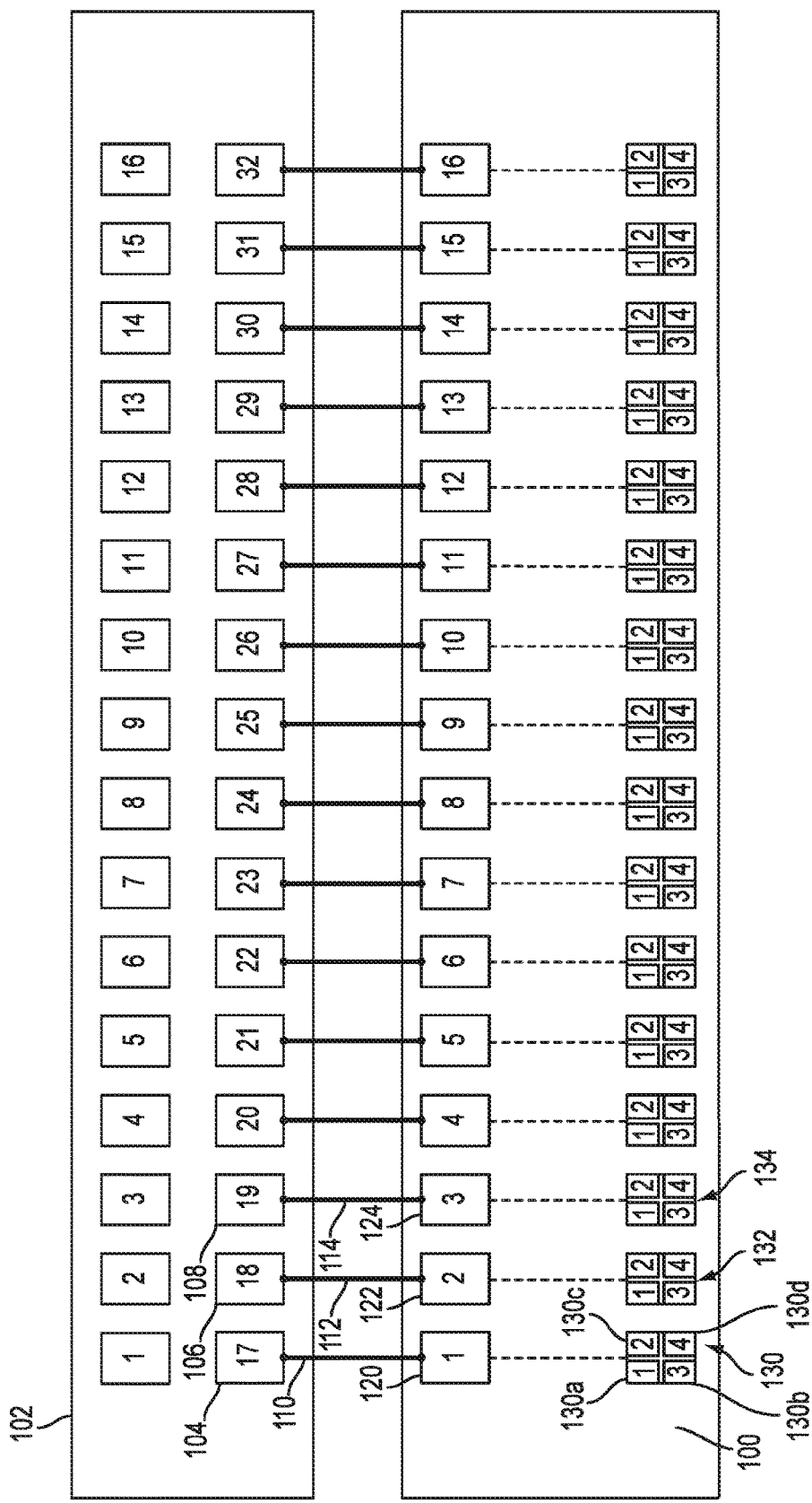
FIG. 1 is schematic diagram of a network switch connected to a patch panel in accordance with an example of the present technology.

Optical patch panels and related methods are provided. In one example, a housing module may have at least one wall arranged to present connectors for mating with optical cables. A plurality of trunk connectors may be arranged in at least one wall of the housing module, each of the trunk connectors being connectable to an optical trunk line entering the housing module. A plurality of duplex fiber connectors (e.g., LC connectors, SC connectors, FC connectors, etc.) may be arranged in at least one wall of the housing module, the duplex fiber connectors being operable to mate with downstream networking equipment. The duplex fiber connectors may be arranged in clusters, each cluster presenting a group of four pairs of duplex fiber connectors. The duplex fiber connectors in a cluster may be optically coupled to one of the plurality of trunk lines via the plurality of trunk connectors.

In a more specific example, an optical patch panel is provided that includes a rack mount housing having a plurality of walls arranged to present connectors for mating with optical cables. A plurality of trunk connectors may be arranged in at least one of the walls of the rack mount housing, each of the trunk connectors being connectable to an optical trunk line entering the rack mount housing. A plurality of duplex fiber connectors may be arranged in at least one of the walls of the rack mount housing. The duplex fiber connectors may be operable to mate with downstream networking equipment. The duplex fiber connectors may be arranged in clusters, each cluster presenting a group of four pairs of duplex fiber connectors. The duplex fiber connectors in each cluster may be optically coupled to a separate one of the plurality of trunk lines via a separate one of the plurality of trunk connectors. Each of the plurality of trunk connectors may have a lateral position relative to a side of the rack mount housing. Any one of the clusters of four pairs of duplex fiber connectors to which any one trunk connector is coupled may be positioned at substantially the same lateral position as is the trunk connector, to provide a substantially straight-through mapping (e.g., a mapping that does not substantially cross over other optical cables or optical fibers) within the rack mount housing.

In another example, an optical patch panel is provided that includes a rack mount housing (e.g., 1 RU to 3 RU) having a plurality of walls arranged to carry connectors configured to mate optical cables. A plurality of trunk connectors may be carried by a first wall of the rack mount housing, the trunk connectors having at least 40 Gbps (gigabits per second) capacity and being connectable to an optical trunk line entering the rack mount housing. The optical trunk line may originate with a server that has a corresponding data output that may use a 40 Gbps optical cable. A plurality of duplex fiber connectors may be arranged in a second wall of the rack mount housing, the duplex fiber connectors being operable to mate with downstream networking equipment. The duplex fiber connectors may be arranged in clusters, each cluster presenting a group of four pairs of duplex fiber connectors having at least 10 Gbps capacity each. A plurality of optical fibers within the rack mount housing may connect the duplex fiber connectors in each cluster to a trunk connector. Each of the plurality of trunk connectors may have a lateral position in the first wall relative to a side of the rack mount housing. The cluster of duplex fiber connectors to which any one of the trunk connectors is coupled may be positioned at substantially the same lateral position in the second wall as is the trunk connector to provide a substantially straight-through mapping within the rack mount housing.

Disorganized optical fiber installations may introduce the potential for debris, may involve significant cable management issues, and may increase operation installation and troubleshooting time. At least some versions of the present technology address each of these issues, while reducing or minimizing technician effort, potential cabling errors and increasing efficiency. The figures illustrate various aspects of devices and systems in accordance with varying examples of the technology. As illustrated in the generalized case in FIG. 1, the present technology provides a patch panel 100. The patch panel for optical cables may be considered high density in comparison to existing patch panels. The patch panel enables connections for a number of breakouts from upstream networking equipment, such as servers, routers, media converters, switches and the like. One such exemplary device is shown at 102, which may be, for example, a higher tier server (e.g., Tier 1 server). In the example shown, the server may include thirty-two output ports 104, 106, 108, etc. (shown in the figure numbered in component 102 as ports 1 through 32), each capable of supplying a 40G signal. In this configuration, a 40G channel may be divided into four separate 10G channels. In prior systems, such an operation would use a great deal of cabling and much attention would be given to ensure that the proper breakout cable is attached to the proper port, or is properly marked so as to be properly mated with the correct downstream component, etc.

In the example shown, each of the server ports 104, 106, 108, etc., may be QSFP (quad small form-factor pluggable) ports. The QSFP or QSFP+ is a compact, hot-pluggable transceiver used for data communications applications. The transceiver interfaces with a network device motherboard (for a switch, router, media converter or similar device) to a fiber optic cable or trunk line used to carry optical signals for the QSFP transceiver. QSFP is an industry format jointly developed and supported by many optical network component vendors, allowing data rates up to 40 Gbps. A series of trunk lines 110, 112, 114, etc., may be provided, each having a QSFP MPO (multi-fiber push-on/pull-off) connector that mates with a corresponding connector in the QSFP port.

The trunk lines 110, 112, 114, etc., may be easily mated with corresponding QSFP ports 120, 122, 124, etc., carried by patch panel 100. The patch panel may include a series of clusters 130, 132, 134 of duplex fiber connectors to which individual 10G lines may be coupled. Each cluster may include four pairs of duplex fiber connectors, corresponding to the breakout requirements most often called for in communicating with downstream servers, other network devices or other applications. As is shown by example in cluster 130 in FIG. 1, four pairs 130a, 130b, 130c and 130d are provided. Each of these pairs may include a transmission fiber and a receiving fiber, thus providing connectivity for the 10G line. Generally, the duplex fiber connectors will be coupled to the patch panel to provide an effective interface for attaching cables to the connectors. Thus, an operator may easily and quickly, with one hand, install or remove a duplex fiber cable from the pairs provided.

In this manner, the present technology provides a optical patch panel that accommodates multiple MTP/MPO connectors (MTP connector is a brand name for an MPO connector), breaks out the MTP/MPO optical connections to the four optical channels, and presents the discreet channels in groups of four duplex fiber (client) connections. The optical patch panel may also provide a relatively high-density optical patch panel for servers using optical networking connectivity. Further, the use of the rack mounted housing as an optical patch panel for patching a trunk cable to multiple duplex fiber connectors may provide an optical patch panel that is less susceptible to debris and damage. More specifically, a data center may have many racks of servers and debris may exist in the data center. Thus, the optical patch panel may protect the optical cables from damage. Since the optical cables and connectors are mounted in a fixed rack mounted housing, the optical cables and connectors are less susceptible to damage when servers, routers, switches or other components are moved, repaired or otherwise accessed by administrative personnel.

In one example, the connection from the higher tier (e.g., Tier 1) component or switch 102 may be an existing MTP/MPO to MTP/MPO patch cable. This may be accomplished by an initial connection from the higher tier (e.g., Tier 1) component or switch to the corresponding MTP/MPO port on the patch panel. Once so configured, the duplex fiber (e.g., LC, SC, etc.) ports are available for patching to servers or downstream networking equipment that uses a 10G connection. The 10G connection is commonly used with existing equipment as the fan-out for a 40G trunk line. While such a configuration is encompassed by the present technology, and several such examples are provided for convenience, the present technology is not limited to this configuration. Generally, the present technology provides systems that allow an incoming signal (e.g., a trunk line) to be split into four pairs of duplex fiber connectors. As such, nearly any incoming signal or cable, defined as having a predetermined signal capacity, can be split into four equal duplex fiber connectors. Thus, each duplex fiber connector can have a capacity of about ¼ (one quarter) of the associated trunk connector. Thus, the present technology can be used to fan out a 40G trunk cable into four 10G local fiber connectors; a 100G trunk cable into four 25G local fiber connectors, a 400G trunk cable into four 100G duplex fiber connectors, etc.

The connections within the patch panel 100 between the trunk ports 120, 122, 124, etc., and the clusters of duplex fiber or LC connectors 130, 132, 134, etc., may be made in a variety of manners. As shown in FIG. 6, in one example, optical fibers may be routed directly from the trunk ports to the duplex fiber ports, as is the case shown by example at 150 in FIG. 6. In another example, a cassette, shown schematically at 152 in FIG. 6, may be provided that presents the duplex fiber or LC ports (shown as cluster 136). Optical lines 154 may connect trunk port 126 to cassette 152. The cassette 152 may be pre-configured to receive optical lines or cables 154 and to be mounted to front wall 200 of patch panel 100'. The cassette may provide a convenient and easily adaptable structure in which the patch panel may be modified for differing applications. In the case that different connectors or ports are desired in the clusters, a differing cassette may be obtained to provide such functionality with little change in the overall design of the patch panel. In addition to the configuration included in the figures, the cassette 152 can also be configured to contain both the trunk port 126 and the cluster of duplex ports 136. In this example, the configuration shown in FIG. 6 would not require in-cabinet lines or cables 154.

The present technology may also provide flexibility in the overall size of the patch panel and/or the number of ports accommodated by the patch panel. The patch panel may be a fixed design allowing for maximum front-facing duplex fiber connectors in a 1 RU (rack unit) or 1.5 RU space. The MTP/MPO connectors may be carried by a rear wall of the panel to provide pass-through style cabling. In the examples shown in FIGS. 1 and 6, a 1 RU panel may accommodate sixteen MTP/MPO rear ports and sixty-four duplex fiber front-facing ports. By increasing the height of the panel by about 9/10" (or 1.5 RU), the panel may accommodate thirty-two MTP/MPO ports and one hundred and twenty-eight duplex fiber ports, as shown by the examples in FIGS. 2A, 2B, 3, 4 and 5.

Figure 2A:
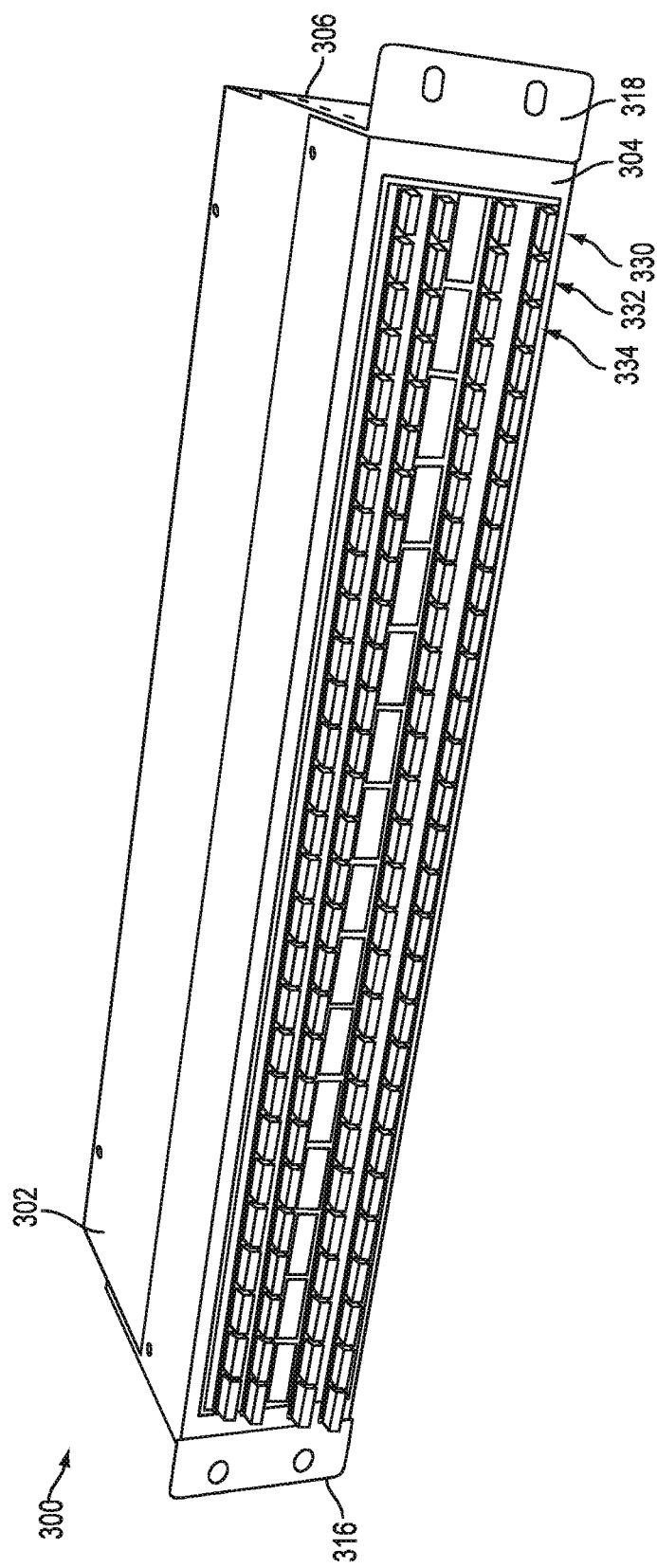
FIG. 2A is a perspective view showing a front face of a rack mount housing in accordance with an example of the present technology.
Figure 2B:
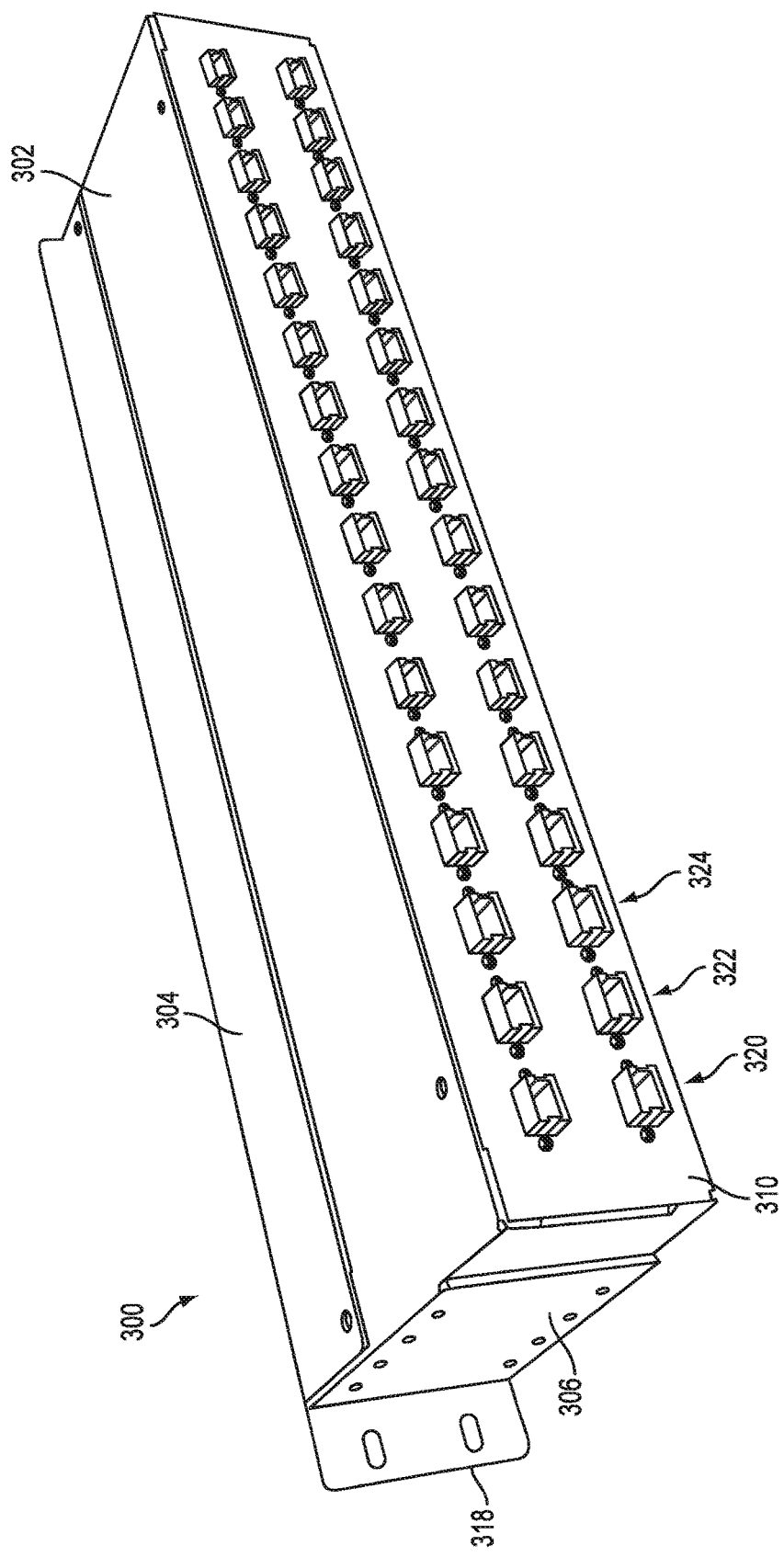
FIG. 2B is a perspective view showing a rear face of the rack mount housing of FIG. 1A.
Figure 3:
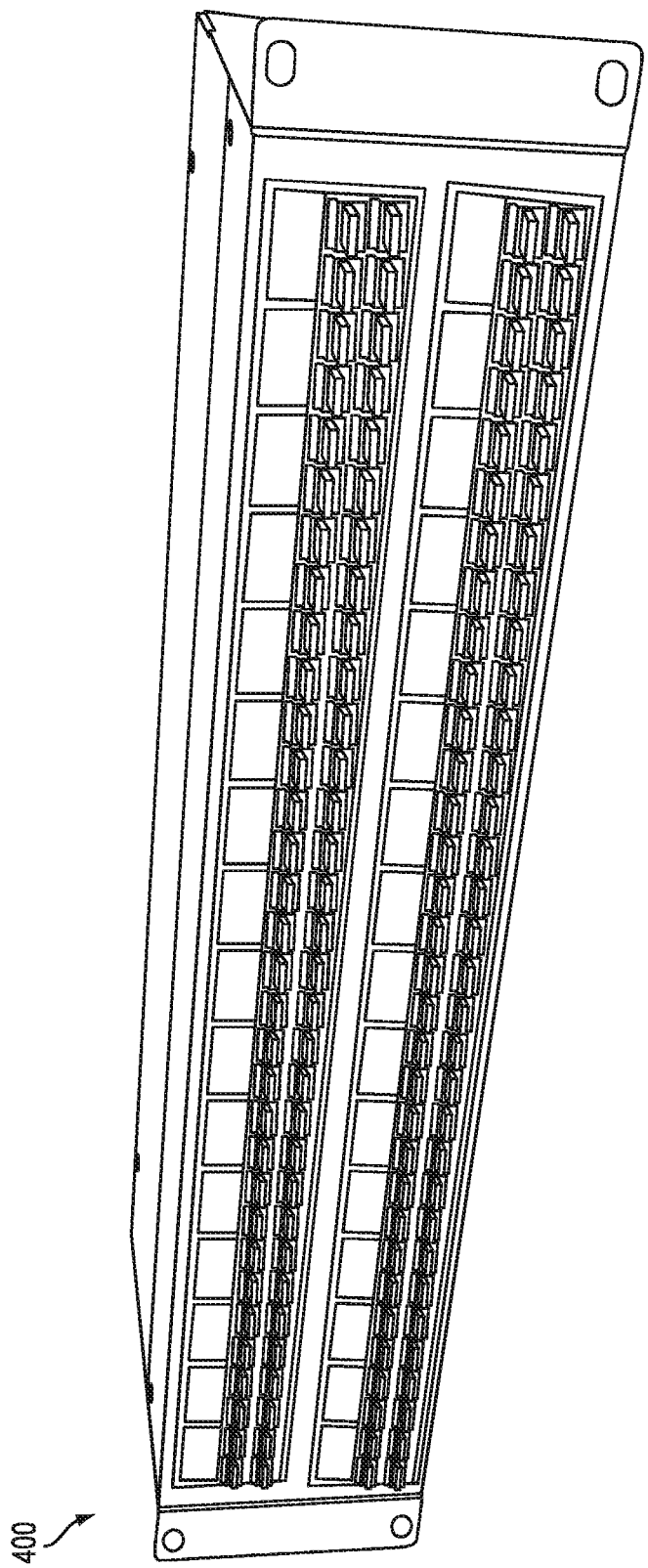
FIG. 3 is a perspective view showing a front face of another rack mount housing in accordance with an example of the present technology, showing duplex fiber ports arranged in a different manner.

Referring specifically to the configuration illustrated in FIGS. 2A and 2B, the patch panel 300 may include a housing module 302 that may have one or more walls arranged to both provide physical support for the panel and to carry and/or present for use with the various connectors or ports used for mating with optical cables. In the example shown, the housing module may include a front wall 304, a pair of side walls 306 (only one of which is visible in the figures), a rear wall 310, and a top 302 and bottom wall (the bottom wall not visible in the figures). The walls in this case collectively define a rack mountable housing module suitable for mounting in a network rack (not shown). An ear set (i.e. flanges) including ear brackets 316, 318 may be coupled to or may extend from the rack mountable housing to facilitate mounting of the rack within the network rack. The particular structure and methodology utilized in mounting the patch panel within a network rack may vary.

The patch panel 300 may include a plurality or series of trunk connectors 320, 322, 324, etc. (FIG. 2B). In this example, the trunk connectors are carried by or attached to the rear wall 310. The trunk connectors are connectable to an optical trunk line entering the housing module (such as trunk lines 110, 112, 114 in FIG. 1, not shown in this figure). A plurality of duplex fiber connectors 330, 332, 334, etc. (FIG. 2A), may be arranged in at least one wall of the housing module. In this example, the duplex fiber connectors are carried by the front wall 304. These duplex fiber connectors are operable to mate with downstream networking equipment and may be arranged in a series of clusters, each cluster presenting a group of four pairs of duplex fiber connectors (such as connectors 130a, 130b, 130c, 130d shown in FIG. 1). For the sake of simplicity in describing the technology, in FIGS. 2A, 2B, 3, 4, 5 and 6, each duplex fiber connector is not necessarily shown, nor is each trunk port or duplex fiber port specifically called out by a reference number. Each of the duplex fiber connectors in each cluster associated with each duplex fiber connector or port 330, 332, 334, etc., may be optically coupled to one of the optical fibers in the plurality of trunk lines via the plurality of trunk connectors 320, 322, 324, etc.

In the examples shown in FIGS. 2A, 2B, 3, 4 and 5, at least thirty-two trunk connectors are provided, with at least one hundred and twenty-eight corresponding duplex fiber connectors. In the examples shown in FIGS. 1 and 6, at least sixteen trunk connectors are provided, with at least sixty-four corresponding duplex fiber connectors. The positioning of the various connectors in the patch panel may vary. FIGS. 2A, 2B, 3 and 6 represent examples wherein the trunk ports are arranged in a rear wall of the patch panels 300, 400 and 100'. In these cases, the duplex fiber connectors are arranged in a front wall of the patch panel.

The embodiments of FIGS. 2A, 2B, 3 and 6 may include an arrangement whereby each trunk connector is roughly aligned with the duplex fiber connectors to which it is coupled. In other words, each of the plurality of trunk connectors may have a lateral position relative to a side wall of the housing module or relative to the overall housing module. Any one of the clusters of duplex fiber connectors to which any one trunk connector is coupled may be positioned at substantially the same lateral position as is the trunk connector. In this manner, a substantially "straight-through" mapping within the housing module may be provided. This may mean that optical fibers used for the mapping do not cross over or interlace with optical fibers from other duplex fiber connector clusters.

In other words, in particular embodiments, the optical lines or cables connecting trunk ports with duplex fiber ports run in a substantially straight line through the patch panel. This is the arrangement shown by example in FIG. 6, where optical lines 150 run roughly straight through the patch panel 100' from trunk ports 120, 122, 124, etc., to duplex fiber ports 130, 132, 134. In another example, the trunk ports may have a specified lateral order (e.g., port 120 is positioned closest to an end of rear wall 201, followed by port 122, followed by port 124, etc.). Each of the duplex fiber ports may have a corresponding lateral order, such that the duplex fiber port 130 is positioned closest to an end of wall 200, followed by duplex fiber port 132, followed by duplex fiber port 134, etc. Thus, while the corresponding ports are not located directly across from one another, the cabling connecting the corresponding ports need not cross or overlap or extend under the cabling connecting other corresponding ports.

Figure 4:
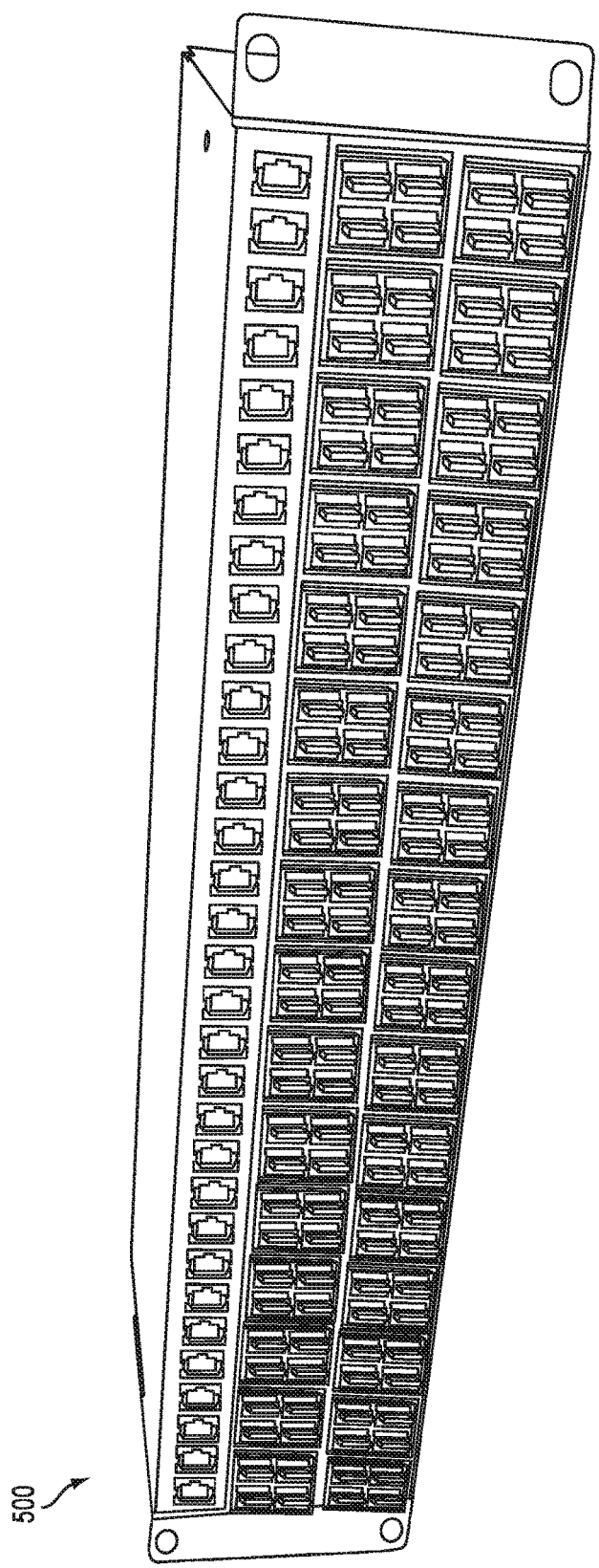
FIG. 4 is a perspective view showing a front face of another rack mount housing in accordance with an example of the present technology, showing a series of trunk ports and duplex fiber ports arranged in a single wall.
Figure 5:
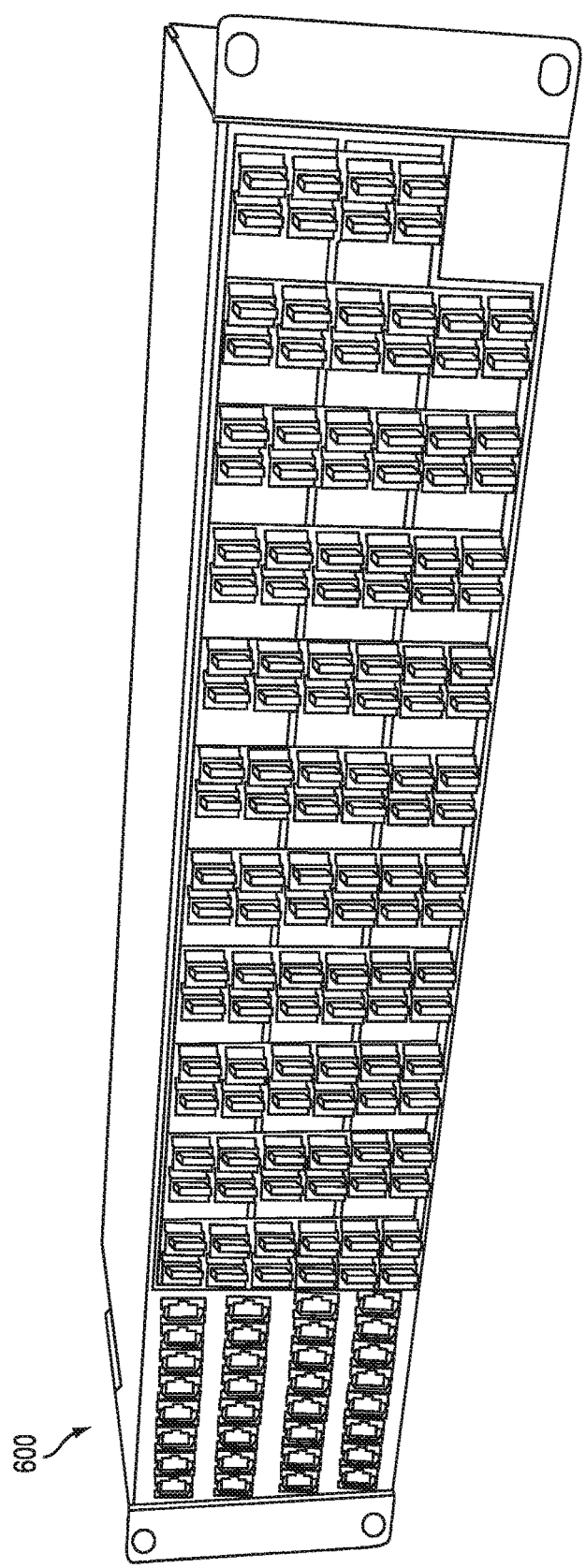
FIG. 5 is a perspective view showing a front face of another rack mount housing in accordance with an example of the present technology, showing a different arrangement of trunk ports and duplex fiber ports arranged in a single wall.

FIGS. 4 and 5 represent variations wherein the trunk ports and the duplex fiber connectors are carried by the front wall of the patch panels 500, 600, respectively. This arrangement of the trunk connectors relative to the duplex fiber connectors may vary depending upon the cabling needs of any particular application. In these applications, it may be easier to route the various optical lines entering the trunk connectors or exiting the duplex fiber connectors to the desired locations, if the ports are presented on the same face or wall of the panel.

The example shown in FIG. 4 provides one row of trunk ports aligned along an upper portion of the front wall of the panel 500, with two rows of clusters of duplex fiber connectors arranged near a lower portion of the front wall. The patch panel 600 shown in FIG. 5 includes four rows of trunk connectors arranged at the leftmost side of the front wall, with six rows of duplex fiber connectors arranged to the right. Those examples in which a single wall carries the trunk ports and the duplex fiber ports may simplify the construction of the panel, as a single wall is provided, with minimal rails or other attachment structure used to couple the patch panel to a network rack. Further, the use of a single wall with the trunk ports and duplex fiber ports may also provide useful organizations for installations where accessing the back wall of the patch panel is difficult or infeasible.

While the examples include several variations on port layout, it is to be understood that a variety of other configurations are contemplated and are considered to be encompassed by this disclosure. Also, while the trunk ports are consistently shown as being carried by one wall or another, the trunk ports and duplex fiber ports need not be carried by only one wall of the patch panel. The trunk ports or duplex fiber ports may, as a group, span multiple walls of the panel. For example, half of the trunk ports may be carried on one wall, and half by another wall. Alternatively, a quarter of the trunk ports may each respectively be on four separate walls, etc.

In the embodiments illustrated in FIGS. 2A, 2B, 3, 4 and 5, the front wall of the patch panel 300, 400, 500, 600, etc., is a substantially a planar component, with each connector presented at substantially the same elevation relative to a front portion of the patch panel. As is shown in FIG. 6, however, one or more walls of the patch panel may be staggered or angled so as to provide connectors at different elevations, relative to a front portion of the patch panel. The front wall 200 of patch panel 100' includes two sections 202, 204 that angle outwardly from side walls of the panel by about 105 degrees. In this manner, a technician may have an easier time connecting and disconnecting optical cables to/from the panel, as the spacing between the clusters of duplex fiber connectors 130, 132, 134 is greater than if a flat configuration were used.

Figure 7A:
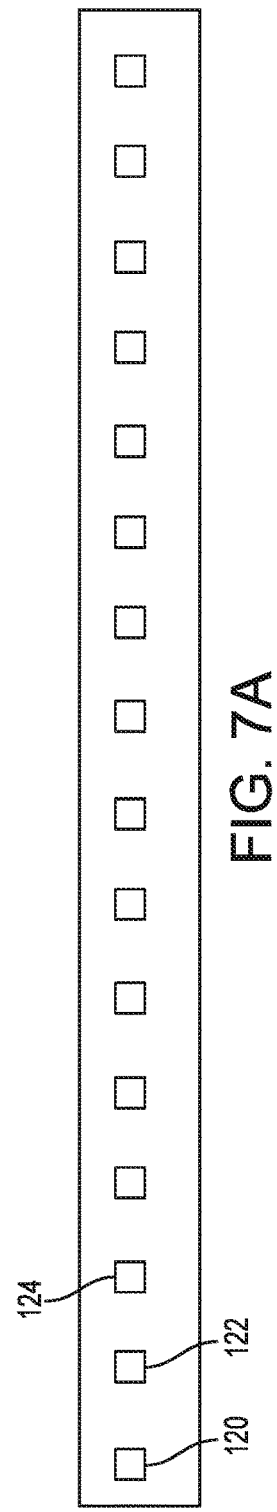
FIG. 7A is a schematic diagram of a rear wall of a sixteen-channel patch panel in accordance with an example of the present technology.
Figure 7B:
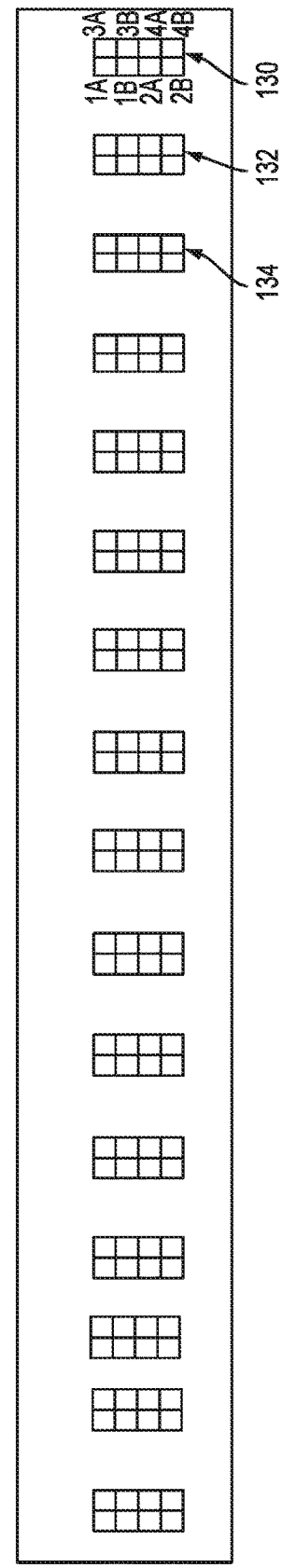
FIG. 7B is a schematic diagram of a front wall of the patch panel of FIG. 7A in accordance with an example of the present technology.

FIGS. 7A, 7B and 7C illustrate exemplary arrangements of connectors for a patch panel in accordance with an example of the technology. FIG. 7A illustrates schematically a configuration similar to that shown in FIG. 1 or 6. In this case, there are sixteen trunk ports 120, 122, 124, etc., arranged across a wall of a patch panel. As shown in FIG. 7B, sixteen clusters 130, 132, 134 of duplex fiber connectors are arranged across or within another wall of the patch panel. Each of the clusters includes four pair of duplex fiber connectors, labeled, for example, as 1A and 1B, 2A and 2B, 3A and 3B and 4A and 4B of cluster 130. Each pair of connectors may comprise a single communication loop, with one optical line providing a transmission line, and another of the pair providing a receiving line.

FIG. 7C illustrates an exemplary line or "pin" diagram for use with such a configuration. The present technology is well suited for use with existing MPO (Multiple Fiber Push-on Pull-off) connectors having twelve terminal pins, a known industry configuration seen in many optical connector arrangements. Such convention provides a linear array of pinouts, with twelve pins arranged in a row. In many cases, only the four outermost pins on each end of this row (eight total pins) are used in QSFP applications. The innermost four pins are often not used. Thus, in one example of the technology, each trunk port, or MPO port, presents twelve pins that are to be fanned out to four pairs of duplex fiber connectors.

FIG. 7C illustrates one manner in which the optical lines may be connected for this technology. Note that the same diagram 140 applies to each trunk port 120, 122, 124, etc., and its associated cluster of duplex fiber ports 130, 132, 134, etc. As shown in block 140, Pins 1 and 12 of the MPO 120 (the two outermost pins) may be connected to duplex fiber connectors 1A and 1B, respectively (the upper left pair of duplex fiber connectors of cluster 130 of FIG. 7B). Pins 2 and 11 (the next two innermost pins of the MPO 120) may be connected to duplex fiber connectors 2A and 2B, respectively (the lower left pair of duplex fiber connectors of cluster 130 of FIG. 7B). Pins 3 and 10 (the next two innermost pins of the MPO 120) may be connected to duplex fiber connectors 3A and 3B, respectively (the upper right pair of duplex fiber connectors of cluster 130 of FIG. 7B). Pins 4 and 9 (the next two innermost pins of the MPO 120) may be connected to duplex fiber connectors 4A and 4B, respectively (the lower right pair of duplex fiber connectors of cluster 130 of FIG. 7B).

Figure 8A:
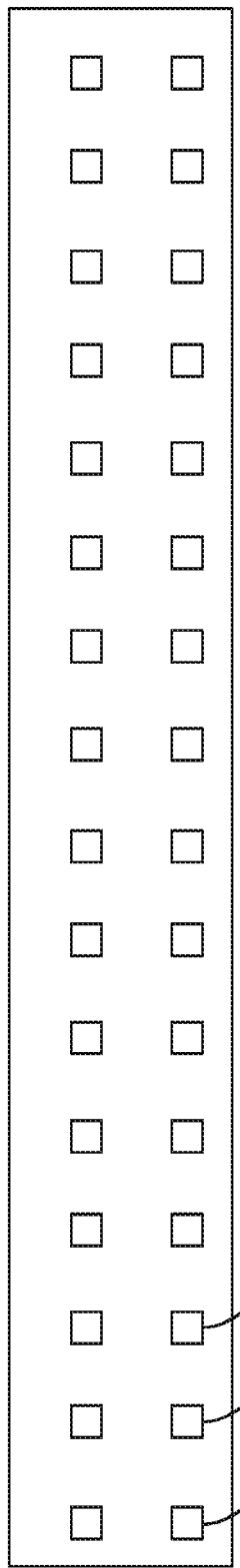
FIG. 8A is a schematic diagram of a rear wall of a thirty-two-channel patch panel in accordance with an example of the present technology.
Figure 8B:
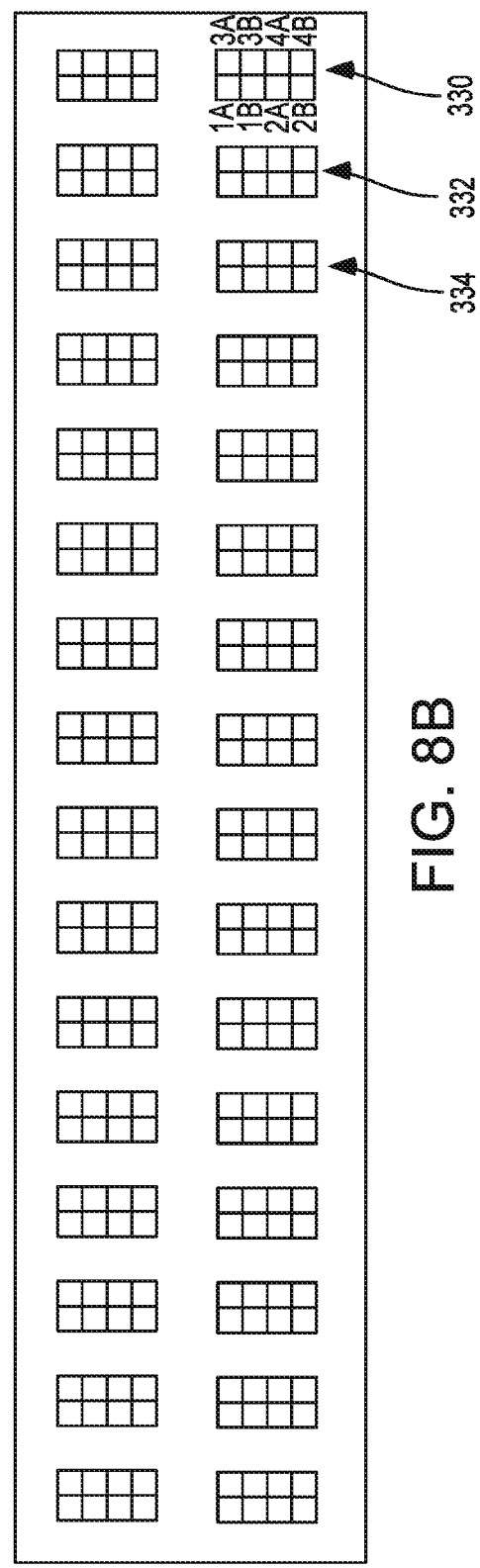
FIG. 8B is a schematic diagram of a front wall of the patch panel of FIG. 8A in accordance with an example of the present technology.

FIGS. 8A, 8B and 8C illustrate a similar arrangement of optical line connection/"pin" out for patch panels that provide thirty-two trunk ports, and a corresponding one hundred and twenty-eight duplex fiber connectors. This arrangement is similar to the patch panel 300 shown in FIGS. 2A and 2B. Thus, trunk ports 320, 322, 324 are connected to clusters of duplex fiber ports 330, 332, 334. Similar to the previous example, diagram 240 applies to each of the pinouts of each of thirty-two clusters 330, 332, 334, etc., of duplex fiber connectors.

While the duplex fiber connectors are shown having a specific geometric configuration in each of FIGS. 7B and 8B, it is to be understood that the duplex fiber connectors may be configured in a variety of ways. In the configuration shown, the connector for the optical cable that is connected to pairs 1A and 1B may have a generally vertical orientation, with a first two connectors aligned vertically atop one another, with another two connectors immediately aside these first two. It is also contemplated that the duplex fiber connector pairs may be arranged horizontally (relative to the patch panel assembly), such that four connectors on four optical cables would be aligned horizontally and stacked one atop another. This would, of course, require that the pairs of duplex fiber connectors 1A, 1B, etc., be wired differently than is shown in FIGS. 7C and 8C.

The present technology thus provides an optical patch panel that accommodates multiple MTP/MPO connectors, breaks out the MTP/MPO optical connections to the four optical channels, and presents the discreet channels in groups of four duplex fiber (client) connections. Once so configured, the duplex fiber ports (e.g., LC ports) are available for patching to client servers or upstream networking equipment requiring a 10G connection. This is accomplished while reducing or minimizing technician effort, potential cabling errors and increasing efficiency.

The present technology may be utilized in a variety of applications and may be relatively easily tailored for specific job requirements. As shown in FIG. 6, a cassette 152 may be provided to tailor the duplex fiber connections to specific cases. Different use cases may call for different cassette types. For example, the QSFP SR4 optical module uses multimode fiber and has a 150 meter (OM3) or 300 meter (OM4) distance limitation. In one example, OM4 fiber may be used in the cassette with low-loss splicing and connectors to allow for the maximum distance.

In another example, at least two data center use cases may be addressed: 40G TOR switch connecting to multiple in-rack 10G server clients; and connecting multiple 10G connections from a centralized location to multiple 10G TOR switches within 300 meters. The QSFP LR parallel optical module requires single mode fiber with a distance limitation of 2 kilometers (LR-Lite) and 10 kilometers (LR). This use case is for connecting multiple 10G connections from a centralized location to multiple network devices that are greater than 300 meters and up to 10 kilometers.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Further, as used herein, it is intended that the terms "fiber optic cables" and/or "optical fibers" include any types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An optical patch panel, comprising:
a rack mount housing having a plurality of walls arranged to carry optical connectors to couple optical cables;
a plurality of trunk connectors carried by a first wall of the rack mount housing, the trunk connectors having at least 40 Gbps (gigabits per second) capacity and being connectable to an optical trunk line entering the rack mount housing;
a plurality of duplex fiber connectors arranged in a second wall of the rack mount housing, the duplex fiber connectors being operable to couple with downstream networking equipment, the duplex fiber connectors being arranged in clusters, each cluster presenting a group of four pairs of duplex fiber connectors having at least 10 Gbps capacity per pair;
a plurality of optical fibers within the rack mount housing connecting the duplex fiber connectors in a given cluster to a corresponding trunk connector; and wherein each of the plurality of trunk connectors has a lateral position in the first wall relative to the rack mount housing, and wherein the cluster of the duplex fiber connectors to which any one of the trunk connectors is coupled is positioned at substantially the same lateral position in the second wall as the trunk connector to provide a mapping within the rack mount housing.

2. The panel of claim 1, wherein each trunk connector and each duplex fiber connector is fixed to the rack mount housing to provide an interface to attach cables to the connectors.

3. The panel of claim 1, further comprising a cassette installed within the rack mount housing, the cassette supporting the duplex fiber connectors.

4. The panel of claim 1, further comprising a plurality of optical trunk lines, each being connectable to one of the trunk connectors, and each of the optical trunk lines including four pairs of optical fibers and being optically connectable to upstream networking equipment.

5. The panel of claim 1, wherein the trunk connectors comprise MPO (Multiple Fiber Push-on Pull-off) connectors having twelve terminal pins.

6. The panel of claim 5, wherein an upper left pair of duplex fiber connectors of each cluster are connected to first and twelfth terminal pins of the MPO connector, a lower left pair of duplex fiber connectors of each cluster are connected to second and eleventh terminal pins of the MPO connector, an upper right pair of duplex fiber connectors of each cluster are connected to third and tenth terminal pins of the MPO connector, and a lower right pair of duplex fiber connectors of each cluster is connected to fourth and ninth terminal pins of the MPO connector.

7. An optical patch panel, comprising:
a rack mount housing having a plurality of walls arranged to carry optical connectors to couple optical cables;
a plurality of trunk connectors carried by a first wall of the rack mount housing, the trunk connectors having at least 40 Gbps (gigabits per second) capacity and being connectable to an optical trunk line entering the rack mount housing;
a plurality of duplex fiber connectors arranged in a second wall of the rack mount housing, the duplex fiber connectors being operable to couple with downstream networking equipment, the duplex fiber connectors being arranged in clusters, each cluster presenting a group of four pairs of duplex fiber connectors having at least 10 Gbps capacity per pair; and
a plurality of optical fibers within the rack mount housing connecting a group of four pairs of the duplex fiber connectors in a given cluster to a corresponding trunk connector to map the plurality of duplex fiber connectors arranged in the second wall to the plurality of trunk connectors carried by the first wall.

8. The panel of claim 7, wherein each trunk connector and each duplex fiber connector is fixed to the rack mount housing to provide an interface to attach cables to the connectors.

9. The panel of claim 7, further comprising a cassette installed within the rack mount housing, the cassette supporting the duplex fiber connectors.

10. The panel of claim 7, further comprising a plurality of optical trunk lines, each being connectable to one of the trunk connectors, and each of the optical trunk lines including four pairs of optical fibers which are optically connectable to upstream networking equipment.

11. The panel of claim 7, wherein each of the plurality of trunk connectors has a lateral position on the rack mount housing, and wherein any one of the clusters of the duplex fiber connectors to which any one trunk connector is coupled is positioned at substantially the same lateral position as the trunk connector to provide a substantially straight-through mapping within the rack mount housing.

12. The panel of claim 7, wherein at least 16 trunk connectors are provided, with at least 64 corresponding duplex fiber connectors.

13. The panel of claim 7, wherein at least 32 trunk connectors are provided, with at least 128 corresponding duplex fiber connectors.

14. The panel of claim 7, wherein the trunk connectors comprise MPO (Multiple Fiber Push-on Pull-off) connectors having twelve terminal pins.

15. The panel of claim 14, wherein an upper left pair of duplex fiber connectors of each cluster are connected to first and twelfth terminal pins of the MPO connector, a lower left pair of duplex fiber connectors of each cluster are connected to second and eleventh terminal pins of the MPO connector, an upper right pair of duplex fiber connectors of each cluster are connected to third and tenth terminal pins of the MPO connector, and a lower right pair of duplex fiber connectors of each cluster is connected to fourth and ninth terminal pins of the MPO connector.

16. An optical patch panel, comprising:
  a rack mount housing having a plurality of walls arranged to support connectors for mating with optical cables;
  a plurality of trunk connectors carried by at least one of the walls of the rack mount housing, each of the trunk connectors having a predetermined signal capacity and being connectable to one of a plurality of optical trunk lines entering the rack mount housing; and
  a plurality of duplex fiber connectors arranged in at least one of the walls of the rack mount housing, the duplex fiber connectors having a signal capacity of about one quarter of the predetermined signal capacity of the trunk connectors and being operable to mate with downstream networking equipment, the duplex fiber connectors being arranged in clusters, each cluster presenting a group of four pairs of duplex fiber connectors; wherein
  the duplex fiber connectors in each cluster are optically coupled to one of the plurality of optical trunk lines via one of the plurality of trunk connectors, and wherein each of the plurality of trunk connectors has a lateral position on the rack mount housing, and wherein any one of the clusters of the group of four pairs of duplex fiber connectors to which any one trunk connector is coupled is positioned at substantially the same lateral position as is the respective trunk connector to provide a substantially straight-through mapping within the rack mount housing.

17. The panel of claim 16, wherein each trunk connector and each duplex fiber connector are fixed to the rack mount housing to provide an interface for attaching cables to the connectors.

18. The panel of claim 16, further comprising a cassette installed within the rack mount housing, the cassette having the duplex fiber connectors installed therein.

19. The panel of claim 16, wherein at least 16 trunk connectors are provided, with at least 64 corresponding duplex fiber connectors.

20. The panel of claim 16, wherein at least 32 trunk connectors are provided, with at least 128 corresponding duplex fiber connectors.

* * * * *